March 28, 1939.  O. RASMUSSEN  2,152,499
MASTER CYLINDER FOR HYDRAULIC BRAKES
Filed June 1, 1936
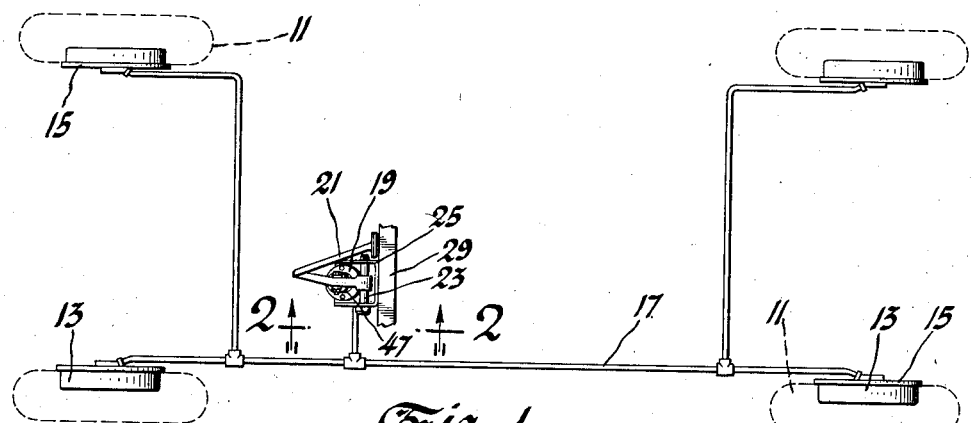
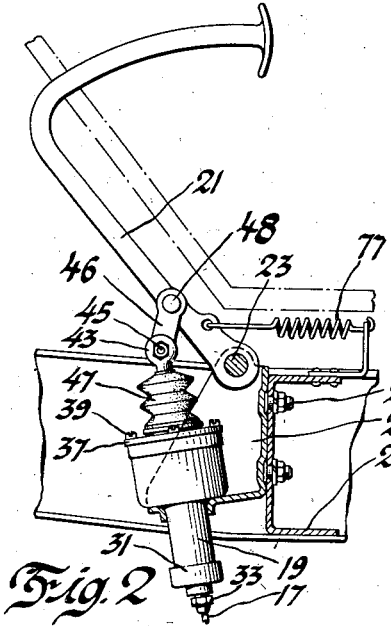
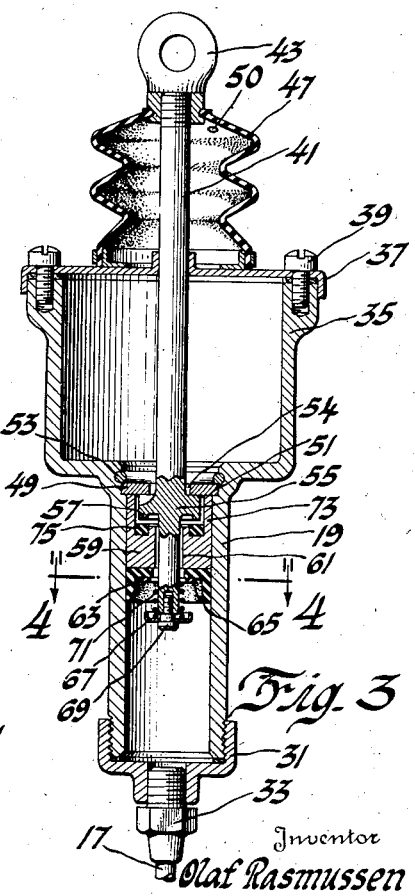
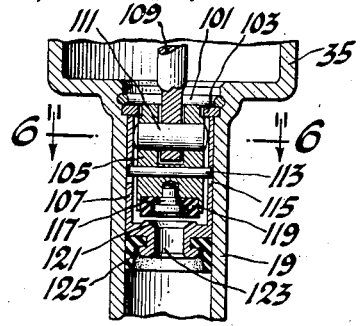
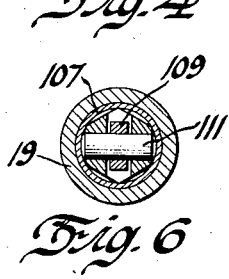
Inventor
Olaf Rasmussen
By Blackmore, Spencer & Flint
Attorneys Patented Mar. 28, 1939

2,152,499

UNITED STATES PATENT OFFICE 2,152,499

MASTER CYLINDER FOR HYDRAULIC BRAKES

Olaf Rasmussen, Dayton, Ohio, assignor to General Motors Corporation, Detroit, Mich., a corporation of Delaware Application June 1, 1936, Serial No. 82,702

1 Claim. (Cl. 60—54.6)

This invention relates to a cylinder and piston arrangement useful elsewhere but designed especially for the master cylinder of a hydraulic brake system for vehicles.

An object of the invention is to provide an arrangement whereby the tendency to draw air into the system is avoided.

Another object is to provide a substantially free return of the piston of the master cylinder after brake application.

As a further object the invention makes possible a positive connection between the piston and its operating rod.

Simplicity in construction and economy in manufacture are among other objects which the invention aims to accomplish.

In the accompanying drawing,

Fig. 1 is a diagrammatic plan view of the hydraulic brake system as applied to a vehicle.

Fig. 2 is a view in elevation as seen from line 2—2 of Fig. 1.

Fig. 3 is vertical section through the master cylinder.

Fig. 4 is a section on line 4—4 of Fig. 3.

Fig. 5 is a vertical section of a modified form.

Fig. 6 is a section on line 6—6 of Fig. 5.

In the drawing, numeral 11 is used to designate the wheels of a vehicle. Associated with each wheel is a drum 13 closed by a cover 15. Within the drum enclosure is a suitable brake mechanism (not shown) to be forced into engagement with the drum by the conventional wheel cylinder assembly (also not shown) of a hydraulic brake applying means. The applying means includes, in addition to the wheel cylinders, a master cylinder 19 and a conduit 17 leading therefrom to the several wheel cylinders. As is usual, the brake is applied by depressing a pedal 21 hinged at 23 to a bracket 25 secured at 27 to a cross frame bar 29 of the chassis. This bracket also carries the master cylinder as shown best in Fig. 2. The novelty herein is to be found in the master cylinder 19. This cylinder has at its lower end a cap 31 into which is threaded the fitting 33 at the end of conduit 17. At its upper end the cylinder 19 is enlarged to form a reservoir 35 closed by a cover 37 secured by fastening means 39. A piston rod 41 reciprocates through cover 37. At its upper end the rod has an eye 43 for pivotal connection at 45 with a link 46 hinged to the pedal by pin 48. Depression of the pedal pushes the rod 41 downwardly through the reservoir. A protecting boot 47 of accordion form is secured at one end to the cover 37 and at its other end to the piston rod.

At the junction of the cylinder 19 and reservoir 35 is a disc 49 held against a shoulder 51 by a ring 53. The piston rod 41 passes through this disc 49 with a clearance at 54. The rod 41 is formed with an inner piston 55 shaped at its lower face to form a seat 57. Surrounding inner piston 55 is an outer or main piston 59 slidable in cylinder 19. This piston 59 has a hole therethrough for the passage of rod 41. Around the rod there are axial passages 61 in the piston. On the lower face of piston 59 is a sealing cup 63 of rubber or the like. This rubber seal 63 and a metal disc 65 have openings of a diameter in excess of that of rod 41. At the end of the rod 41 is a disc 67 held by a member 69 threaded into the end of the rod and a spring 71 is positioned between discs 65 and 67.

In the retracted position of the pistons when both piston 55 and the skirt part 73 of piston 59 engage the stop disc 49, it will be seen that the seat 57 of piston 55 is spaced upwardly from a compressible seal 75 located in an annular recess at the top of the body part of piston 59. With the two pistons in this relative position, there is a free passage between the reservoir and the space beneath piston 59.

The operation of the device is as follows: It may be assumed that a pedal releasing spring—such a spring as 77 for example—has withdrawn the pistons to the positions shown by Fig. 3 where both the inner piston 55 and the skirt of outer piston 59 are stopped by disc 49. With the parts in that position fluid may flow under the influence of any pressure differential in either direction between the reservoir and the master cylinder by way of the passages 61, the raised valve seat 57, the space between the pistons and opening 54. Depression of the pedal brings seat 57 into sealing contact with seal 75 closing the passage and thereafter both pistons move down together forcing fluid through the conduits to the wheel cylinders, whereupon the wheel cylinder pistons move and expand the shoes into contact with the drums. When the brakes are to be released the pedal is restored by spring 77. It will be appreciated that the brake shoe retracting springs may be unable to restore the pistons of the wheel cylinders and effect the reverse flow of fluid as rapidly as the pedal spring 77 seeks to restore the master cylinder piston. As a result there is a tendency to develop at least a temporary low pressure condition in the master cylinder. The low pressure condition has been the cause of drawing air into the system at the wheel cylinders and in some installations expedients have been resorted to to prevent it. In the present case the first movement of piston rod 41 lifts the seat 57 from seat 75 at whatever position in the cylinder 19 the parts may be. Further upward movement of the two pistons jointly occurs without appreciably resistance or development of low pressure because of the open passage between the reservoir and the cylinder 19. During this return movement fluid may flow from the reservoir around the inner piston and through passages 61 to the cylinder 19, thus supplementing any insufficiency in the return flow from the conduit to the master cylinder. When the pistons of the master cylinder reach their fully retracted position, it is quite likely that there will be a reverse flow through the space between the pistons and into the reservoir as the brake shoe retracting springs more leisurely effect the return flow of fluid. With this simple construction, therefore, there is no danger of introducing air into the system, and the master cylinder parts may be restored to release position with no appreciable delay.

In Figs. 5 and 6 is shown a modified form. The reservoir 35 is formed integral with the cylinder 19 as before. The ring 101 holds the stop disc 103 against which the inner piston 105 and the outer piston 107 contact. The lower end of piston rod 109, corresponding to rod 41 of Fig. 3, is hinged by a pin 111 to the forked end of the inner piston. The inner piston has a pin 113 the ends of which move in slots 115 in the wall of the outer piston 107. Securing means 117 attach a seal 119 of rubber or the like to the lower end of inner piston 105. This seal is adapted to engage a seat 121 and an opening 123 at the head or lower end of the outer piston. A suitable sealing cup 125 is seated in a groove of the outer piston around the opening 123, the seal to prevent the passage of fluid when the piston moves downwardly. It will be clear from Fig. 5 that when the seal 119 is raised from the seat 121 fluid may pass in either direction between the cylinder 19 and the reservoir 35, the opening in stop disc 103, the spaces between the walls of the pistons and the opening 123 serving for the passage. Limited movement between the two pistons is afforded by pin 113 and slots 115 whereby the inner piston may be raised and seal 119 lifted from the seat before the pin 113 engages the end of its slot to cause a joint upward movement of the two pistons. The operation of this modification will be understood, it being substantially like the operation of the from shown by Figs. 1 to 4.

I claim:

A master cylinder for a hydraulic brake system, a main piston movable in said cylinder, a piston rod mounted to reciprocate axially relative to said main piston, an inner piston positively connected to said rod, cooperating seal and seat members carried by said main piston and inner piston, means whereby said rod constitutes the sole means for moving said inner piston and is adapted to move it in both directions, movement in one direction acting to cause spaced relation between the seal and the seat, movement of the rod in the opposite direction operable to effect contact of said seat and seal, both piston and inner piston thereafter moving together, said means whereby the rod moves the main piston when the seat and seal are spaced comprising a compressible spring between the main piston and the end of the rod.

OLAF RASMUSSEN.